United States Patent
Wooley et al.

(10) Patent No.: US 9,324,179 B2
(45) Date of Patent: *Apr. 26, 2016

(54) CONTROLLING A VIRTUAL CAMERA

(71) Applicant: LUCASFILM ENTERTAINMENT COMPANY, LTD., San Francisco, CA (US)

(72) Inventors: Kevin Wooley, San Francisco, CA (US); Michael Sanders, San Francisco, CA (US); Steve Sullivan, Mill Valley, CA (US); Spencer Reynolds, San Francisco, CA (US); Brian Cantwell, Albany, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,408

(22) Filed: Jan. 12, 2015

(65) Prior Publication Data
US 2015/0130801 A1 May 14, 2015

Related U.S. Application Data

(63) Continuation of application No. 12/982,426, filed on Dec. 30, 2010, now Pat. No. 8,964,052.

(60) Provisional application No. 61/365,644, filed on Jul. 19, 2010, provisional application No. 61/365,667, filed on Jul. 19, 2010.

(51) Int. Cl.
*G06T 15/20* (2011.01)
*G11B 27/00* (2006.01)
(Continued)

(52) U.S. Cl.
CPC .............. *G06T 15/205* (2013.01); *G06T 13/20* (2013.01); *G06T 19/003* (2013.01); *G11B 27/00* (2013.01); *H04N 5/232* (2013.01); *G06F 3/04815* (2013.01); *G06T 2215/16* (2013.01)

(58) Field of Classification Search
CPC .... H04N 5/2224; G06F 3/011; G06F 3/04815
See application file for complete search history.

(56) References Cited

U.S. PATENT DOCUMENTS 3,916,094 A 10/1975 Marrone
5,697,757 A 12/1997 Lindsay
(Continued)

FOREIGN PATENT DOCUMENTS

EP 1918880 A2 5/2008
GB 2442602 A 9/2008
(Continued)

OTHER PUBLICATIONS

Autodesk, Inc. "Autodesk Maya 2010: Getting Started with Maya," 2009, downloaded from the internet at: http://images.autodesk.com/adsk/files/gettingstaredmaya2010.pdf on Jun. 29, 2011, Cover page, Table of Contents, Chapter 6, 135 pages.
(Continued)

*Primary Examiner* — Ahmed A Berhan
(74) *Attorney, Agent, or Firm* — Kilpatrick Townsend & Stockton LLP

(57) ABSTRACT

Among other aspects, on computer-implemented method includes: receiving at least one command in a computer system from a handheld device; positioning a virtual camera and controlling a virtual scene according to the command; and in response to the command, generating an output to the handheld device for displaying a view of the virtual scene as controlled on a display of the handheld device, the view captured by the virtual camera as positioned.

20 Claims, 10 Drawing Sheets

(51) Int. Cl.
*G06T 19/00* (2011.01)
*G06T 13/20* (2011.01)
*H04N 5/232* (2006.01)
*G06F 3/0481* (2013.01)

(56) References Cited

U.S. PATENT DOCUMENTS

| | | |
|---|---|---|
| 6,091,427 A | 7/2000 | Boezeman et al. |
| 6,144,385 A | 11/2000 | Girard |
| 6,517,207 B2 | 2/2003 | Chapman |
| 6,714,201 B1 | 3/2004 | Grinstein et al. |
| 6,972,765 B1 | 12/2005 | Duplat |
| 7,069,023 B2 * | 6/2006 | Maanoja et al. ............ 455/456.1 |
| 7,088,237 B2 * | 8/2006 | Arcens ..................... 340/539.13 |
| 7,224,983 B2 * | 5/2007 | Budka et al. ............... 455/456.1 |
| 7,324,121 B2 | 1/2008 | Young |
| 7,403,220 B2 | 7/2008 | MacIntosh et al. |
| 7,428,571 B2 * | 9/2008 | Ichimura ....................... 709/203 |
| 7,463,304 B2 | 12/2008 | Murray |
| 7,625,286 B2 | 12/2009 | Hamada |
| 7,628,700 B2 | 12/2009 | Baseflug et al. |
| 7,965,294 B1 | 6/2011 | Milliron |
| 8,079,950 B2 | 12/2011 | Stern et al. |
| 8,194,101 B1 | 6/2012 | Mann et al. |
| 8,421,795 B2 | 4/2013 | Hayakawa et al. |
| 8,606,678 B2 | 12/2013 | Jackowitz et al. |
| 8,701,008 B2 | 4/2014 | Keng et al. |
| 8,847,992 B2 | 9/2014 | Kornmann et al. |
| 8,964,052 B1 | 2/2015 | Wooley et al. |
| 2003/0025802 A1 | 2/2003 | Mayer, Jr. et al. |
| 2004/0027352 A1 | 2/2004 | Minakuchi |
| 2004/0100482 A1 | 5/2004 | Cajolet et al. |
| 2005/0018053 A1 | 1/2005 | Suga et al. |
| 2005/0036036 A1 | 2/2005 | Stevenson et al. |
| 2005/0156932 A1 | 7/2005 | Vienneau et al. |
| 2005/0186884 A1 | 8/2005 | Evans |
| 2005/0187015 A1 | 8/2005 | Suzuki et al. |
| 2006/0030337 A1 * | 2/2006 | Nowak ........................ 455/456.2 |
| 2006/0038890 A1 | 2/2006 | MacIntosh et al. |
| 2006/0090022 A1 | 4/2006 | Flynn et al. |
| 2006/0282873 A1 | 12/2006 | Zalewski et al. |
| 2007/0021125 A1 * | 1/2007 | Zhu et al. .................... 455/456.1 |
| 2007/0106307 A1 | 5/2007 | Bodduluri et al. |
| 2007/0174774 A1 | 7/2007 | Lerman et al. |
| 2007/0262996 A1 | 11/2007 | Fernandez et al. |
| 2007/0270215 A1 | 11/2007 | Miyamoto |
| 2008/0015017 A1 | 1/2008 | Ashida et al. |
| 2008/0094358 A1 | 4/2008 | Sullivan |
| 2008/0225110 A1 | 9/2008 | Lin et al. |
| 2008/0319252 A1 | 12/2008 | Chapman et al. |
| 2009/0002365 A1 | 1/2009 | Kurabayashi |
| 2009/0015679 A1 | 1/2009 | Hayakawa et al. |
| 2009/0017911 A1 | 1/2009 | Miyazaki |
| 2009/0046097 A1 | 2/2009 | Franklin |
| 2009/0069084 A1 | 3/2009 | Reece et al. |
| 2009/0089157 A1 | 4/2009 | Narayanan |
| 2009/0102841 A1 | 4/2009 | Clavadetscher |
| 2009/0102861 A1 | 4/2009 | Turcotte et al. |
| 2009/0284553 A1 | 11/2009 | Seydoux |
| 2009/0309986 A1 | 12/2009 | Mayer |
| 2010/0026809 A1 | 2/2010 | Curry |
| 2010/0045666 A1 | 2/2010 | Kornmann et al. |
| 2010/0045667 A1 | 2/2010 | Kornmann et al. |
| 2010/0062817 A1 | 3/2010 | Seydoux |
| 2010/0085351 A1 | 4/2010 | Deb et al. |
| 2010/0156911 A1 | 6/2010 | Zhao et al. |
| 2010/0169003 A1 * | 7/2010 | Van Der Meer ............... 701/207 |
| 2010/0207950 A1 | 8/2010 | Zhao et al. |
| 2010/0208033 A1 | 8/2010 | Edge et al. |
| 2010/0214313 A1 | 8/2010 | Herman et al. |
| 2012/0021828 A1 | 1/2012 | Raitt et al. |
| 2012/0109377 A1 | 5/2012 | Stern et al. |
| 2012/0223967 A1 | 9/2012 | Mann et al. |
| 2012/0327088 A1 | 12/2012 | Schnitzer et al. |
| 2013/0141427 A1 | 6/2013 | Lucas et al. |
| 2014/0250392 A1 | 9/2014 | Riggins et al. |

FOREIGN PATENT DOCUMENTS

| | | |
|---|---|---|
| JP | 2002-307337 | 10/2002 |
| JP | 2004-225724 | 8/2004 |
| WO | 2010/051493 A2 | 5/2010 |
| WO | 2012/177991 A1 | 12/2012 |

OTHER PUBLICATIONS

Giambrune, Mark: "3D Graphics & Animation, $2^{nd}$ Edition," 2002, New Riders Publishing, USA, XP002695294, pp. 368-380, pp. 372, 373, 376.

Microsoft, "APP HUB Community Forums: Exporting Animation Step Keys," Oct. 21, 2008, downloaded from the internet at: http://forums.create.msdn.com/forums/t/18976.aspx on Jun. 28, 2011, 1 page.

PL Studios, Inc. "Digital Tutors: Community Forums: Thread: Character Animation Problem: Phantom Step Key Pops Leg Up??" Jun. 17, 2009, downloaded from the internet at: http://www.digitaltutors.com/forum/showthread.php?18630-Character-Animation-problem-Phantom-step-key-pops-leg-up on Jun. 28, 2011, 2 pages.

Silicon Graphics, Inc. "IRIX 6.5 Product Release Notes/Information," downloaded from the internet at http://techpubs.sgi.com/library/tpl/cgi-bin/getdoc.cgi?coll=0650&db=relnotes&fname=/usr/relnotes/cosmoworlds on Apr. 2, 2012, 33 pages.

The University of Queensland, "VisLab: Creating and Animating a Rocket," Jan. 18, 2001, downloaded from the internet at: http://www.vislab.uq.edu.au/users/manuals/cosmoworlds/Tutorial/rocket_intro.html on Apr. 2, 2012, 18 pages.

Wikipedia, "Animation" May 28, 2010, downloaded from the internet at: http://web.archive.org/web/20100528081917/http:/en.wikipedia.org/wiki/Animation on Jun. 28, 2011, 10 pages.

Wikipedia, "Bezier Curve," May 30, 2010, downloaded from the internet at: http://web.archive.org/web/20100530233921/http:/en.wildpedia.org/wiki/B%C3%A9zier_curve on Jun. 28, 2011, 10 pages.

Wikipedia, "Computer Animation," Apr. 30, 2010, downloaded from the internet at: http://web.archive.org/web/20100430162149/http:/en.wikipedia.org/wiki/Computer_animation on Jun. 28, 2011, 7 pages.

Wikipedia, "Spline (mathematics)", Oct. 14, 2009, downloaded from the internet at: http://web.archive.org/web/20091014015215/http:/en.wikipedia.org/wiki/Spline_(mathematics) on Jun. 28, 2011, 8 pages.

International Preliminary Report on Patentability issued May 20, 2014 for PCT/US2012/065518, 12 pages.

International Search Report and Written Opinion for PCT/US2012/065518 mailed Apr. 26, 2013, 14 pages.

International Preliminary Report on Patentability issued Dec. 24, 2013 for PCT/US2012/043722, 5 pages.

International Search Report and Written Opinion for PCT/US2012/043722 mailed Oct. 23, 2012, 8 pages.

U.S. Appl. No. 13/168,189, filed Jun. 24, 2011, first named inventor: Adam Schnitzer.

U.S. Appl. No. 13/168,189, filed Jun. 24, 2011, Non Final Rejection mailed Oct. 7, 2013, all pages.

U.S. Appl. No. 13/168,189, filed Jun. 24, 2011, Final Rejection mailed Mar. 24, 2014, all pages.

U.S. Appl. No. 13/168,189, filed Jun. 24, 2011, Non Final Rejection mailed Jul. 2, 2014, all pages.

U.S. Appl. No. 13/168,189, filed Jun. 24, 2011, Notice of Allowance mailed Jan. 15, 2015, all pages.

U.S. Appl. No. 13/679,046, filed Nov. 16, 2012 Non Final Rejection mailed Jun. 12, 2014, all pages.

U.S. Appl. No. 13/679,046, filed Nov. 16, 2012 Final Rejection mailed Dec. 19, 2014, all pages.

U.S. Appl. No. 13/830,439, filed Mar. 14, 2013 Non Final Rejection mailed Feb. 24, 2015, 27 pages.

(56) References Cited

OTHER PUBLICATIONS

Ashcraft, Brian, "A New Era of Game Broadcasting," accessed Feb. 3, 2006, 2 pages. Retrieved from http://kotaku.com/152501/a-new-era-of-game-broadcasting on Jul. 21, 2011.
Australian Patent Examination Report No. 1 for AU application No. 2009248424 dated Jan. 25, 2013, 3 pages.
Australian Patent Examination Report No. 2 for AU application No. 2009248424 dated Nov. 13, 2013, 4 pages.
AVATAR Blog, "New Technology in AVATAR—Performance Capture, Fusion Camera System, and Simul-Cam," dated May 30, 2010. Accessed on Mar. 23, 2015, 2 pages. Retrieved from http://avatarblog.typepad.com/avatar-blog/2010/05/new-technology-in-avatar-performance-capture-fusion-camera-system-and-simulcam.html.
Bridgeport, "Forward kinematics," accessed Aug. 27, 2009, 2 pages. Retrieved from http://wwwlbpt.bridgeport.edu/sed/risc/html/sim/node6.html.
Craftanimations, "Product Demo—Craft Camera Tools and advanced Tank Animation," accessed Mar. 23, 2015, 1 page. Retrieved from https://www.youtube.com/watch?v=NEENfbNdAh4.
Digi-Lab, "Voodoo Camera Tracker: A tool for the integration of virtual and real scenes," accessed Jul. 21, 2011, 18 pages. Retrieved from http://www.digilab.uni-hannover.de/docs/manual.html.
Ditzian, Eric, "Exclusive: Robert Zemeckis Indicates He'll Use Performance-Capture and 3-D in 'Roger Rabbit' Sequel," accessed Mar. 23, 2015, 3 pages. Retrieved from http://moviesblog.mtv.com/2009/11/03/exclusive-rober-zemeckis-indicates-hell-use-performance-capture-and-3-d-in-roger-rabbit-sequel.
Gamecaster, "Elliott Animation Reaps Big Dividends with Craft Camera Tools for Gamecaster's GCS3 Virtual Camera Control Hardware", accessed Mar. 23, 2015, 5 pages. Retrieved from http://www.gamecaster.com/news/-Elliott-Animation-Reaps-Big-Dividends-with-Craft-Camera-Tools-for-Gamecasters-GCS3-Virtual-Camera-Control-Hardware--.
International Search Report for GB0921667.2 dated Feb. 12, 2010, 3 pages.
Kuang, C., "Motion-Capture Invention Promises WETA Digital Effects on a YouTube Budget," dated Apr. 29, 2009. Accessed on Mar. 23, 2015, 3 pages. Retrieved from http://www.fastcodesign.com/1275898/motion-capture-invention-promises-weta-digital-effects-on-a-youtube-budget.
Kunochan, "All These Worlds Are Yours: Leslie Ekker on VFX for '2010'—The Movie, Not the Year," originally published on IDesignYourEyes on Jan. 12, 2010. Accessed on Mar. 23, 2015, 7 pages. Retrieved from http://kunochan.com/?p=1221.
Marketwired, "InterSense Inc. Unveils Proof-of-Concept VCam Lite Handheld Virtual Camera System at SIGGRAPH 2009," dated Aug. 4, 2009. Accessed Mar. 23, 2015, 3 pages. Retrieved from http://www.marketwired.com/press-release/intersense-inc-unveils-proof-concept-vcam-lite-handheld-virtual-camera-system-siggraph-1213373.htm.
Ordonez, S., "Wacom Cintiq reviewed in deep," dated Jun. 18, 2008. Accessed on Mar. 23, 2015, 10 pages. Retrieved from http://www.sosfactory.com/blog/articles/wacom-cintiq-review/.
Panavision, "Technocrane 20," accessed Aug. 27, 2009, 2 pages. Retrieved from http://www.panavision.com/product_detail.php?cat=103&id=110&imgid=158.
PR Newswire, "Lightstorm Entertainment Uses Isilon IQ to Power Production of 'Avatar'", dated Dec. 12. Accessed Mar. 23, 2015, 2 pages. Retrieved from http://www.prnewswire.com/news-releases/lightstorm-entertainment-uses-isilon-iq-to-power-production-of-avatar-79604262.html.
Wikipedia, "Fiduciary marker," accessed Aug. 27, 2009, 2 pages. Retrieved from http://en.wikipedia.org/wiki/Fiduciary_marker.
U.S. Appl. No. 12/982,437, filed Dec. 30, 2010, Final Rejection mailed Dec. 16, 2014, 23 pages.
U.S. Appl. No. 12/982,437, filed Dec. 30, 2010, Non-Final Rejection mailed Jul. 18, 2014, 18 pages.
U.S. Appl. No. 12/982,437, filed Dec. 30, 2010, Final Rejection mailed Mar. 27, 2013, 15 pages.
U.S. Appl. No. 12/982,437, filed Dec. 30, 2010, Non-Final Rejection mailed Dec. 19, 2012, 13 pages.
U.S. Appl. No. 12/982,426, filed Dec. 30, 2010, Notice of Allowance mailed Oct. 8, 2014, 12 pages.
U.S. Appl. No. 12/982,426, filed Dec. 30, 2010, Non-Final Rejection mailed Apr. 8, 2014, 16 pages.
U.S. Appl. No. 12/982,426, filed Dec. 30, 2010, Final Rejection mailed Mar. 28, 2013, 15 pages.
U.S. Appl. No. 12/982,426, filed Dec. 30, 2010, Non-Final Rejection mailed Sep. 7, 2012, 15 pages.

\* cited by examiner

CONTROLLING A VIRTUAL CAMERA

CROSS-REFERENCE TO RELATED APPLICATIONS

This patent application is a continuation application and claims priority under 35 USC 120 to U.S. patent application Ser. No. 12/982,426, filed on Dec. 30, 2010, issued on Feb. 24, 2014, as U.S. Pat. No. 8,964,052 B1, and entitled "Controlling a Virtual Camera," which claims priority under 35 USC 119(e) to U.S. Provisional Patent Application Ser. No. 61/365,644, filed Jul. 19, 2010, entitled "Virtual Set Camera Controller," and to U.S. Provisional Patent Application Ser. No. 61/365,667, filed Jul. 19, 2010, entitled "Virtual Cinematography Functions," the entire contents of all three of which are hereby incorporated by reference.

TECHNICAL FIELD

This document relates to controlling a virtual camera.

BACKGROUND

While advancements in computer technology have been made in recent years, many filmmakers active today have used traditional camera equipment on most if not all of their work. To those professionals, using computer-generated tools in creating a video or an animation remains unfamiliar. It can therefore be difficult to accomplish in the virtual world the things that they are used to creating with standard cameras, such as setting camera angles and choosing camera paths. In a sense, it can be said that some filmmakers speak in traditional language that does not directly translate artistically into computer-generated imagery.

Movie production that involves computer-generated images (CGI) can tend to look animated and require extensive non-realtime artistry. For example, it can take days to weeks for teams of artists to lay out a scene, set and block computer-generated cameras, assets and composition. 2D story boards are sometimes generated, but they may not convey enough 3D information. 3D animatics are sometimes used, but they may be rudimentary and limiting in capability and fidelity.

SUMMARY

The invention relates to controlling a virtual camera.

In a first aspect, a computer-implemented method includes: receiving in a computer system a command generated by a user activating a function on a handheld device; ceasing position control of a virtual camera in a virtual scene in response to the command; and subsequently resuming the position control according to motion capture input from the handheld device.

In a second aspect, a computer-implemented method includes: receiving in a computer system a command generated by a user activating a function on a handheld device; repositioning a virtual camera in a virtual scene in response to the command; and subsequently controlling the virtual camera according to motion capture input received from the handheld device.

In a third aspect, a computer-implemented method includes: receiving in a computer system a command generated by a user activating a function on a handheld device; in response to the command, constraining a virtual camera in a virtual scene relative to an object in the virtual scene; and recording with the constrained virtual camera.

In a fourth aspect, a computer-implemented method includes: receiving in a computer system a command generated by a user activating a function on a handheld device; and recording a snapshot of a virtual scene using a virtual camera in response to the command.

In a fifth aspect, a computer-implemented method includes: receiving at least one command in a computer system from a handheld device; positioning a virtual camera and controlling a virtual scene according to the command; and in response to the command, generating an output to the handheld device for displaying a view of the virtual scene as controlled on a display of the handheld device, the view captured by the virtual camera as positioned.

Implementations can include any or all of the following features. The command is generated using a touchscreen on the handheld device. The method further includes selecting another virtual camera in the virtual scene based on a user input made on the handheld device and generating another view of the virtual scene with the other virtual camera. The output is generated substantially in real time with the command. The method further includes generating a 3D placeholder point in the virtual world based on a user input made on the handheld device. The display includes a touchscreen, and the method further includes receiving and storing a digital overlay record for the view generated using the touchscreen. The method further includes generating an animation including the view, and editing the animation based on a user input made on the handheld device. The editing comprises setting a start frame or an end frame for the animation. The method further includes receiving motion capture input from the handheld device. The method further includes recording a camera angle in the computer system using the motion capture input. The method further includes generating an animation including the view, and applying handheld motion to the animation using the motion capture input. The motion capture input is generated by a user performing a gesture, and the method further includes performing at least one action on the virtual scene or the virtual camera based on the motion capture input. The computer system has virtual assets defined for the virtual scene, and wherein the virtual scene is modified to add, change, relocate or remove at least one of the virtual assets. The method further includes receiving audio recorded using the handheld device, and storing the audio in association with the virtual scene. The method further includes receiving video of a physical scene recorded using the handheld device. The virtual scene includes a representation of the motion capture stage, and wherein the command specifies that the representation be aligned with at least one virtual object. The virtual object is another virtual camera, a character or a set piece. The handheld device is operated in a motion capture stage, wherein the virtual scene includes a representation of the motion capture stage, and wherein the command specifies that the representation be aligned with at least one physical object detected in the motion capture stage. The command specifies multiple physical objects, the method further including performing a best-fit algorithm that seeks a position for the virtual camera that differs least from a physical relationship between the handheld device and the physical objects.

In a sixth aspect, a computer program product tangibly embodied in a computer-readable storage medium includes instructions that when executed by a processor perform a method comprising: receiving at least one command in a computer system from a handheld device; positioning a virtual camera and controlling a virtual scene according to the command; and in response to the command, generating an output to the handheld device for displaying a view of the virtual scene as controlled on a display of the handheld device, the view captured by the virtual camera as positioned.

In a seventh aspect, a computer program product tangibly embodied in a computer-readable storage medium includes instructions that when executed by a processor generate a graphical user interface comprising: a first input control for a user to select at least one physical object detected on a motion capture stage; a second input control for the user to select at least one virtual object defined in a virtual space; and a third input control for the user to cause an assignment of the selected physical object to the selected virtual object, wherein a representation of the motion capture stage in the virtual space is arranged using the assignment.

Implementations can include any or all of the following features. The graphical user interface further includes a control for specifying at least one additional constraint. The graphical user interface further includes a control for specifying at least one degree of freedom.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In examples herein, it is described that a user such as a moviemaker can operate and interact with a virtual scene by inputting certain commands or values, and can view a visual presentation of the resulting visual scene.

Figure 1:
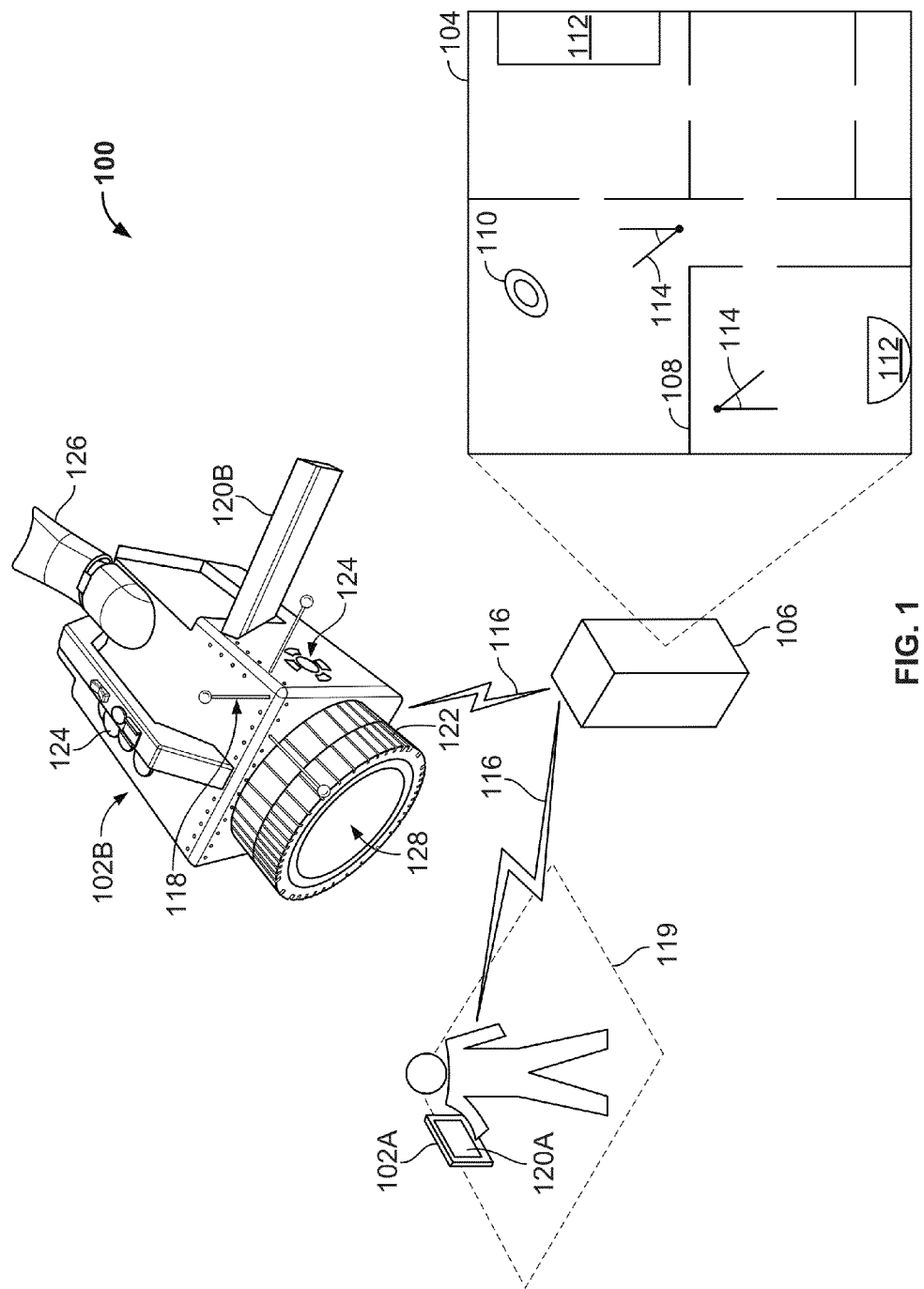
FIG. 1 schematically shows a system with handheld devices and a virtual scene.

FIG. 1 schematically shows a system 100 with handheld devices 102A and 102B and a virtual scene 104. The virtual scene 104 is generated by one or more application programs in a computer system 106. For example, the virtual scene can be the CGI framework, forming a software model of an intended movie set, by which video animations are generated. Animation created using the virtual scene 104 can serve either as augmentation to other video content (e.g., traditional video shot on a physical stage or set) or as video content in its own right (e.g., in an animation motion picture). The virtual scene 104 can be stored in the computer system 106 in any suitable format including, but not limited to, renderable geometry or another technique for maintaining and manipulating visual objects.

Any suitable type of handheld device 102 that can control the virtual scene 104 can be used. Here, the handheld device 102A has a tablet form factor. For example, the handheld device 102A includes a generally flat housing with at least one display, such as a touchscreen. Here, the handheld device 102B has the form factor of a camera (e.g., a camcorder), which can give a realistic and familiar feel to the user operating the handheld device. For example, the handheld device can have a body generally in shape of a solid rectangle (e.g., a box), a lens-like portion near the front end, an ocular or eyepiece near the rear end (i.e., facing the user), a handle, controls, and a display mounted on the body. In the present description, when the handheld device 102 is mentioned, this refers to either of the devices 102A and 102B. The handheld device 102 can have other form factors in some implementations.

Here, the virtual scene 104 is schematically shown to include a layout 108 to define a 3D space, seen from above. In some implementations, the layout 108 can form an indoor environment (e.g., a house or caves) in which one or more characters 110 can be controlled. For example, one or more of the character(s) 110 can move according to a predefined script (e.g., to perform acts that are part of a story). As another example, one or more of the character(s) can be programmed with logic to act in response to outer stimuli or other events, such as the presence or absence of other characters, assets, virtual cameras, etc.

One or more assets 112 (e.g., furniture, natural objects, landscape, etc.) can be defined in the virtual scene 104. For example, an asset can be an immovable object (e.g., a lake), a movable object (e.g., a book), or a self-propelled object (e.g., a car). To define the 3D space, the layout 108 also includes a third dimension (not visible in the illustration), and characters, assets or other features can be positioned or move at arbitrary heights or depths in the layout depending on the design. That is, using the handheld device 102 the user can input the necessary commands or information to modify the virtual scene, for example to add, change, relocate or at least one of the assets 112.

The virtual scene 104 can be used to generate images or video sequences. For this purpose, one or more virtual cameras 114 can be defined in the virtual scene 104. In some implementations, a virtual camera is an abstract definition including a point in space and a direction for the field of view. For example, the point represents the node point inside the "lens" of the virtual camera where "light rays" converge. In a virtual scene, the light rays are represented by virtual rays modeled to have properties similar to light; e.g., color, intensity, duration, propagation, reflection, refraction, etc. The field of view defines the "direction" in the virtual space that the virtual camera is facing. For example, one of the virtual cameras 114 here faces the character 110 and another faces one of the assets 112. When a virtual camera is active, the computer system 106 registers an image or a video sequence based on the virtual rays that the camera receives. For example, by using multiple virtual cameras, the same scene or event can be captured from more than one perspective. Images and/or video sequences can later be assembled or merged.

The handheld device 102 communicates with the computer system 106 using one or more connections 116, such as through a wired or wireless network connection. The handheld device 102 can control the computer system in one or more regards, and can receive and respond to output from the computer system. For example, the handheld device can generate instructions for an application program that creates and manages the virtual scene 104. Such instructions can control any suitable aspect of the virtual scene, such as the layout 108, the character(s) 110, the assets 112 and/or the virtual camera(s) 114. For example, the handheld device can control which of the virtual cameras is active (i.e., which camera's output is to be received), placement and/or movement of the virtual camera.

The handheld device 102 can be used to generate video recordings of the virtual scene 104. First, the handheld device 102 can generate control instructions for the virtual scene 104 and/or the virtual cameras 114 based on user input through any suitable technique. In some implementations, motion tracking of the handheld device 102 is used. That is, the motion of the handheld device in one or more dimensions can be captured and used for controlling or modifying the virtual scene. In this example, the handheld device 102B has motion capture markers 118 designed to be detected by an external tracking system, such as by the computer system 106, within an area 119. Here, the rods of the motion capture markers 118 extend in each of three spatial dimensions, for tracking the handheld device's 3D movement. That is, the user holding the device 102B can move the device, such as within the area 119, and this motion is tracked and used for generating commands or data for the computer system 106. The views observed by the virtual camera as controlled by the handheld device 102B are then recorded as a video sequence.

The handheld device 102A here includes a display 120A for presenting images, videos and/or other information to the user. Similarly, the handheld device 102B includes a display 120B. In some implementations, the handheld device receives a real time output of the virtual scene 104 through the connection 116, such as video imagery generated by one or more of the virtual cameras 114. The display 120A or B can then present such image(s) to the user. As such, a playback function for recorded virtual-scene content can be provided.

When the motion of the handheld device is captured in real time and used to control a virtual camera, the image presentation can give the user a realistic experience where panning, tilting and/or yawing the handheld device is translated into corresponding manipulations of the virtual camera. Any suitable display technology can be used including, but not limited to, LCD or LED. In some implementations, the display 120 features touchscreen functionality, such as will be described in examples below. The handheld device 102 can have any suitable form factor, including, but not limited to, a tablet or a camera form factor.

In some implementations, the body of the handheld device 102 can have one or more input controls, a communication module for the connection 116 (e.g., a wireless transmitter or a network interface card), the display 120, and motion capture technology (e.g., by sensor(s) or motion capture markers). Some or all of such components can be controlled by a processor in the handheld device executing suitable instructions from a computer-readable medium (e.g., a memory or a hard drive).

Here, the handheld device 102B further includes a lens ring 122, controls 124 on the top and on the side(s), and an eyepiece 126. For example, the lens and/or eyepiece may be less prominent or omitted (e.g., to resemble a camera where the lens and/or eyepiece is integrated into the main housing).

One or more mechanical features on the handheld device can perform a function. In some implementations, a mechanical input is translated into a suitable electronic format (e.g., into a digital command or data) and forwarded to the computer system 106 for controlling the virtual scene 104 and/or the virtual camera(s) 114. For example, one or more of the lens ring 122 can be mounted in rotatable and/or slidable engagement with the body of the handheld device. The setting of such ring(s) can be translated into corresponding digital information, for example to represent a choice of zoom level or focus length (i.e., continuous alternative values), or a choice among predefined aspect ratios (i.e., discrete alternative values). In some implementations, other camera features can be controlled by the lens ring 122 and/or the eyepiece 126 including, but not limited to, lens choice, optical filters or shutter angle. In various implementations, the controls on the handheld device can be all mechanical controls, or all virtual controls (e.g., virtual commands that the user issues under guidance the display 120), or a combination of both.

In some implementations the handheld device 102B can perform one or more traditional camera functions. For example, optics 128 such as one or more lenses, can be mounted on the handheld device, and can focus incoming light rays from a physical scene onto a suitable component, such as a film medium or an electronic light sensor. Still images and/or video sequences can be recorded. Such image(s) can be stored in the handheld device and optionally transferred to the computer system 106, for example to generate a composite image from the physical scene and the virtual scene. Such images or video from a physical scene can be presented on the display 120B.

The handheld device 102 can be used for performing asset management regarding the virtual scene 104. In some implementations, the user can select one or more assets, and move the asset(s) to another location in the virtual scene, or to another virtual scene. For example, the user can relocate the asset to a depth closer to or farther from the virtual camera 114 by drawing the asset nearer the virtual camera (i.e., to a lower depth) or push it further away from the virtual camera (i.e., to a higher depth). The user can move the asset in any other dimension (e.g., upward/downward or left/right, from the user's view). This movement can be regulated by motion capture of the handheld device (i.e., such that turning the handheld device is translated into a corresponding turn inside the virtual scene) or by navigation controls (e.g., a joystick or arrow keys). In some implementations, the user can also or instead manipulate one or more other features, such as a character or the layout 108 (FIG. 1), and/or configure abstract aspects of the virtual scene, such as rules or forces that are applied to objects.

Other examples of interaction with the virtual scene will be described below with reference to FIG. 4.

Figure 2:
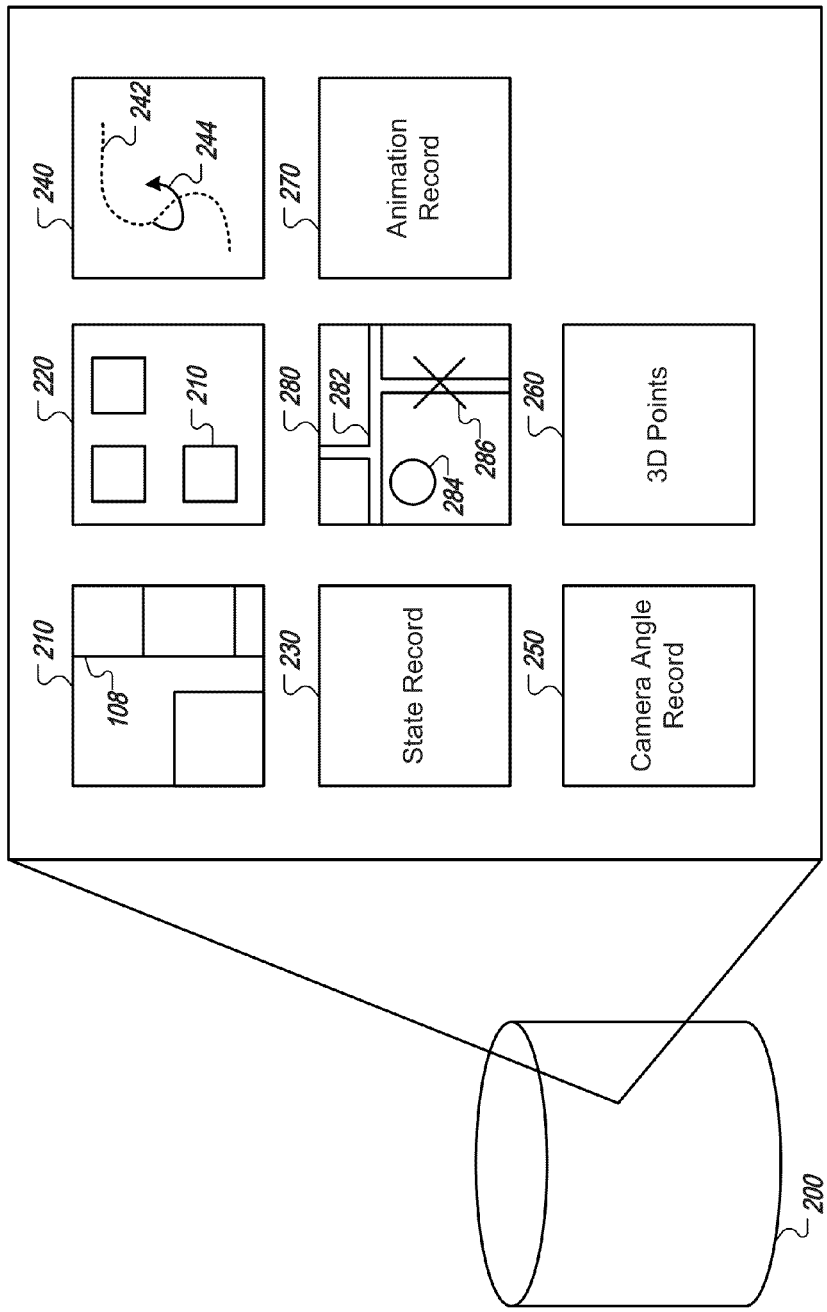
FIG. 2 shows examples of records that can be generated or used for a virtual scene.

FIG. 2 shows examples of records that can be generated or used for a virtual scene. Here, a repository 200 is configured to store and make available computer-based information or executable instructions, in any suitable format(s). For example, the repository 200 can be implemented as a hard drive that is included in or accessible to the computer system 106 (FIG. 1).

The user can activate a snapshot function to generate one or more snapshots 210. In some implementations, this can involve taking a snapshot of the entire virtual scene in its particular current state. As another example, only a selected part of the virtual scene can be included in the snapshot. Here, the snapshot 210 includes at least information corresponding to some of the layout 108 having a particular state.

The snapshot 210 can be stored in the handheld device and/or in the computer system and can be used for one or more purposes. For example, multiple snapshots can be assembled in a sequence to build a storyboard 220 for a movie project; or a snapshot can later be used to revert the virtual scene and/or the virtual camera(s) to the state it or they had when the snapshot was taken. Particularly, one or more state records 230 can be generated that detail the state information for all relevant aspects of the virtual scene at a particular time. In some implementations, the state record 230 includes the snapshot 210.

In some implementations, one or more animated camera paths 240 is recorded in the repository 200. The animated camera path is a record with instructions for moving one or more virtual cameras. For example, the virtual camera can be programmed to move along a path 242 for a particular virtual scene or layout. The animated camera path 240 can specify one or more particular transformations 244 including, but not limited to, a translation, a rotation, a yaw, a pitch, a roll, and combinations thereof. As another example, particular settings for a virtual camera can be stored, either as part of the animated camera path 240 or elsewhere, such as in a separate record. Here, the repository 200 includes a camera angle record 250 that stores one or more camera positions including orientation information for the camera. For example, the camera angle record can be generated based on tracked motion, and can be used to bring the virtual camera to a predefined location/orientation.

A 3D point 260 can be defined anywhere in the virtual scene. Such a point can act as a placeholder for one or more objects, such as for a virtual camera, a character, an asset or for a portion of layout. For example, the user can generate the 3D point by making a certain command, and the point where the virtual camera is currently located can then be registered as the 3D point. In some implementations, the user can define 3D points using another approach, such as by placing an aiming reticle on a visual presentation of the virtual scene (e.g., as seen on the display), and the selected point is then registered. The 3D point can be registered using coordinates in any suitable coordinate system.

The images and/or video content recorded by a virtual camera can be stored in form of one or more animation records 270. For example, the animation record can include a video clip showing at least part of the virtual scene's layout, characters, assets or other objects. The animation record 270 can be edited using the handheld device or the computer system. For example, the user can select a portion of an existing video sequence by specifying respective start and end frames for the selected portion.

In some implementations, the handheld device and the display 120 (FIG. 1) are configured for touchscreen functionality. This can allow the user to enter commands or other information without using a keyboard, mouse or similar input device. Such entries can be made in any of various modes of the handheld device, such as in a playback mode where digital video is running on the display, or in a snapshot mode, where the display is showing the snapshot 210.

One example of an input generated using a touchscreen is a digital overlay record 280. Assume that a view of the virtual scene is being displayed on the handheld device. Here, the current display includes, in part, a layout 282 of the virtual scene. The layout is here illustrated in a lighter shade to distinguish it from other things. The director or another moviemaker may wish to make annotations that directly relate to what is shown on the display. By activating a digital overlay mode, the user can draw, write or make any other annotations directly on the display. Here, the user adds content 284 and 286 using the touchscreen in the digital overlay mode. For example, the content 284 can illustrate an object (i.e., a character, asset or layout portion) that the user wishes to have added to the layout 282. As another example, the content 286 can illustrate an object that the user wishes to have removed from the layout 282. The digital overlay record 280 is stored with the currently presented view of the virtual image, such as: in association with the snapshot; in association with the particular timestamp(s) within the video clip; or in association with the area of the layout. Accordingly, the digital overlay record 280 can be brought back to the screen when needed, to review the notes or other comments made during the earlier viewing. In some implementations, the handheld device has a microphone, and this can be used to record audio snippets (e.g., brief verbal notes about a scene) that are associated with the currently presented view of the virtual image, for example by including the recorded audio in the digital overlay record 280.

Figure 3:
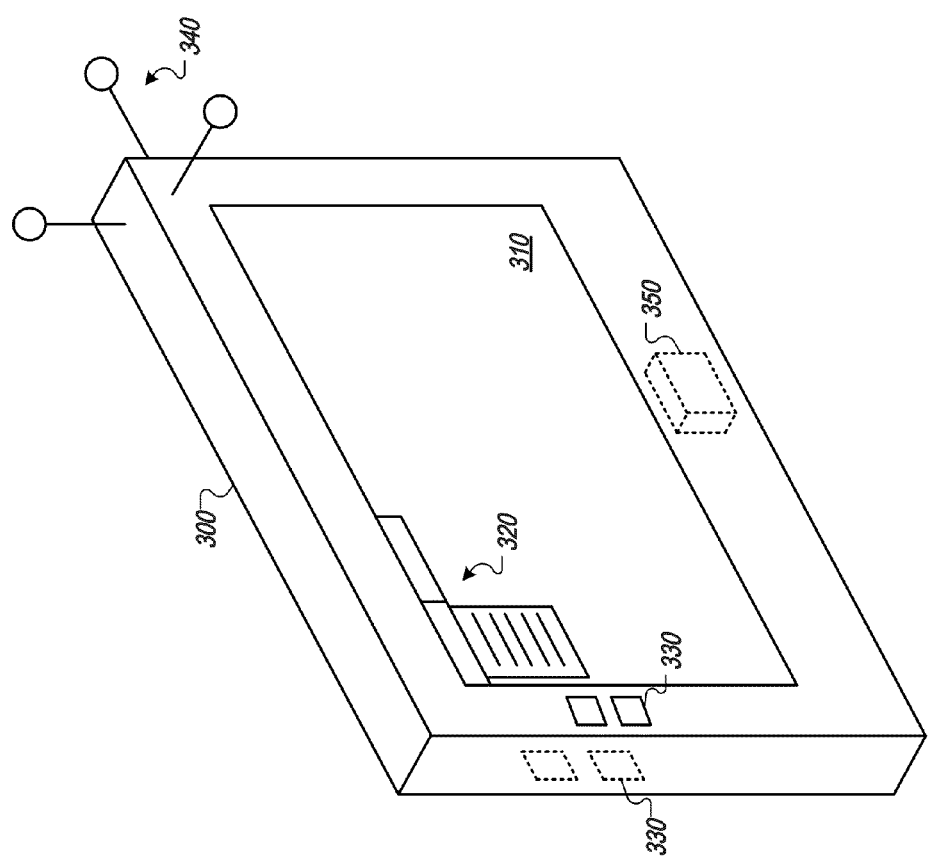
FIG. 3 shows a handheld device with a touchscreen.

FIG. 3 shows a handheld device 300. Here, the handheld device 300 has essentially a tablet form factor. For example, the handheld device has a generally flat configuration with a display 310 covering a substantial part of one of the major surfaces. The display 310 can have touchscreen functionality such that the user enters commands and interacts with the device by selecting options on the screen.

In some implementations, one or more virtual buttons 320 can be defined on the display. For example, the buttons can correspond to functions that are available in the application or other software that generates the virtual scene, and the user employs the button(s) to effectuate or inhibit those functions, as applicable. In addition to, or instead of, the virtual buttons, the handheld device 300 can have one or more mechanical controls 330. For example, the mechanical controls can include one or more buttons, scroll wheels or joysticks. The mechanical controls can be located on any surface(s) of the handheld device 300, such as on the front and back surfaces, as illustrated here. In some implementations, a mechanical control can be located in or near a finger indentation.

The handheld device 300 can be motion captured. In some implementations, an external tracking system can track the handheld device, such as using optical or audio signals. For example, motion capture markers 340 can be mounted on the device for detection by an external system, such as the computer system 106 (FIG. 1). Here, the motion capture markers 340 include light-colored marker spheres mounted on rods. In some implementations, the motion capture markers are selectively attachable to the handheld device, for example by holders. Any suitable fastening technique can be used including, but not limited to, threads, magnets, adhesive, bayonet mounts, friction fit. Here, the rods of the motion capture markers extend in each of three spatial dimensions, for tracking the handheld device's 3D movement. In some implementations, rods of different lengths can be used. For example, longer rods can facilitate better perception of 3D movement when the handheld device is further away from the external tracking system.

Other tracking techniques can be used. In some implementations, the handheld device 300 can include a motion tracking device 350, such as an accelerometer or any other suitable sensor. Based on a calibrated starting position (e.g., the origin in an arbitrary coordinate system), the accelerometer(s) can detect the device's movement and from this its location, orientation and/or velocity can be determined. As other example, magnetic or audio sensors can be used to detect the position and/or movement of the handheld device. As yet another example, an optical detector (e.g., a camera) can be mounted on, or be integrated in, the handheld device to capture its motion. The signals from any such tracking devices or sensors can be processed, either on the handheld device 300 using a suitable algorithm, or in the computer system 106 (FIG. 1), and the resulting information can be used to generate the instructions for controlling the virtual scene 104 and/or the virtual camera(s) 114.

The captured motion can be used to control the operation, location and/or movement of virtual cameras. For example, the user navigates around in the virtual scene by moving the handheld device, and the real time live output of the virtual camera can be seen on the display. In some implementations, secondary technology such as that exemplified above is used with the device to give information about any of multiple degrees of freedom per frame. For example, six degrees of freedom can include three spatial dimensions (e.g., for x- y- and z-dimensions) and three rotational dimensions (i.e., tilt, pan and roll). The obtained information is used to match the real space to the virtual space. For example, the tracking system is used to match the real and virtual worlds so that the 3D render aligns with the real world, or so that the 3D world moves correctly when the device is moved, to name just two examples. This technology can be incorporated in the device, for example in form of internal GPS and/or tilt or motion sensing device. This technology can be external to the device. For example, any suitable external tracking devices can be used.

In some implementations, the motion capture can also or instead be used to enhance an existing video sequence. For example, assume that such a video was recorded in the virtual scene and that one or more of the virtual cameras was moving during the shot. In such a shot, if the path that the virtual camera follows was defined in the computer system (i.e., the path was not defined by motion capture input), then the virtual camera's movement may be entirely smooth. For example, if the virtual camera is moved forward in a horizontal direction at a fixed height from the ground, the resulting image is perfectly steady. That is, there are no vibrations or other disturbances of the image because the virtual camera is moved exactly along a well-defined path. However, in some movie projects a moviemaker seeks to make a dramatic or artistic statement precisely by using a handheld video camera, such that there is a noticeable unsteadiness or shakiness in the picture. For example, handheld cameras are sometimes used to portray the view seen by someone who is walking or running, which can give viewers a more engaging impression.

With reference now again to the video from the virtual camera, the moviemaker can apply tracked motion recorded from the handheld device to the existing video sequence. In some implementations, the "handheld" aspects of the captured motion can be separated from the "path" aspects. That is, one can remove the motion capture data describing that the device is moved in a northern directions for five feet, then panned 90 degrees to the right and continuing its path in an eastern direction. In contrast, the data corresponding to shaking and unsteadiness in the above movements can be kept. For example, a filtering process can be used for such separation. The filtering can remove low-frequency motion (e.g., camera translation) and keep high-frequency motion (e.g., camera vibrations). The handheld aspects of the captured motion can then be applied to the existing video, for example by re-recording the sequence with the handheld movement added to the predefined path.

User gestures can be used as input for the virtual scene and/or the virtual camera. In some implementations, a user gesture while holding the motion-tracked device is recognized and triggers a corresponding input. For example, such gestures that can be tracked include, but are not limited to, rolling the handheld device, facing the device display downward, and gently shaking the device.

As another example, user gestures can be recognized on a touchscreen. In some implementations, whether the screen currently has any virtual buttons or menus visible, certain shapes drawn on the touchscreen can be recognized as having special meanings. For example, the user can swipe one or more fingers in a predefined pattern to cause the computer system to start or stop playback or recording, to move the virtual camera, or to select objects.

In some implementations, the handheld device 300 includes a handle attached to a body of the device. The handle is attached at the back of the device. For example, the handle can include a bar extending along a main axis of the device, the bar mounted to the housing with a swivel or a hinge. The bar can include a handle at one or both ends, the handle(s) configured to be held by the user's hand while the device is in use (e.g., while the display is facing the user).

Figure 4:
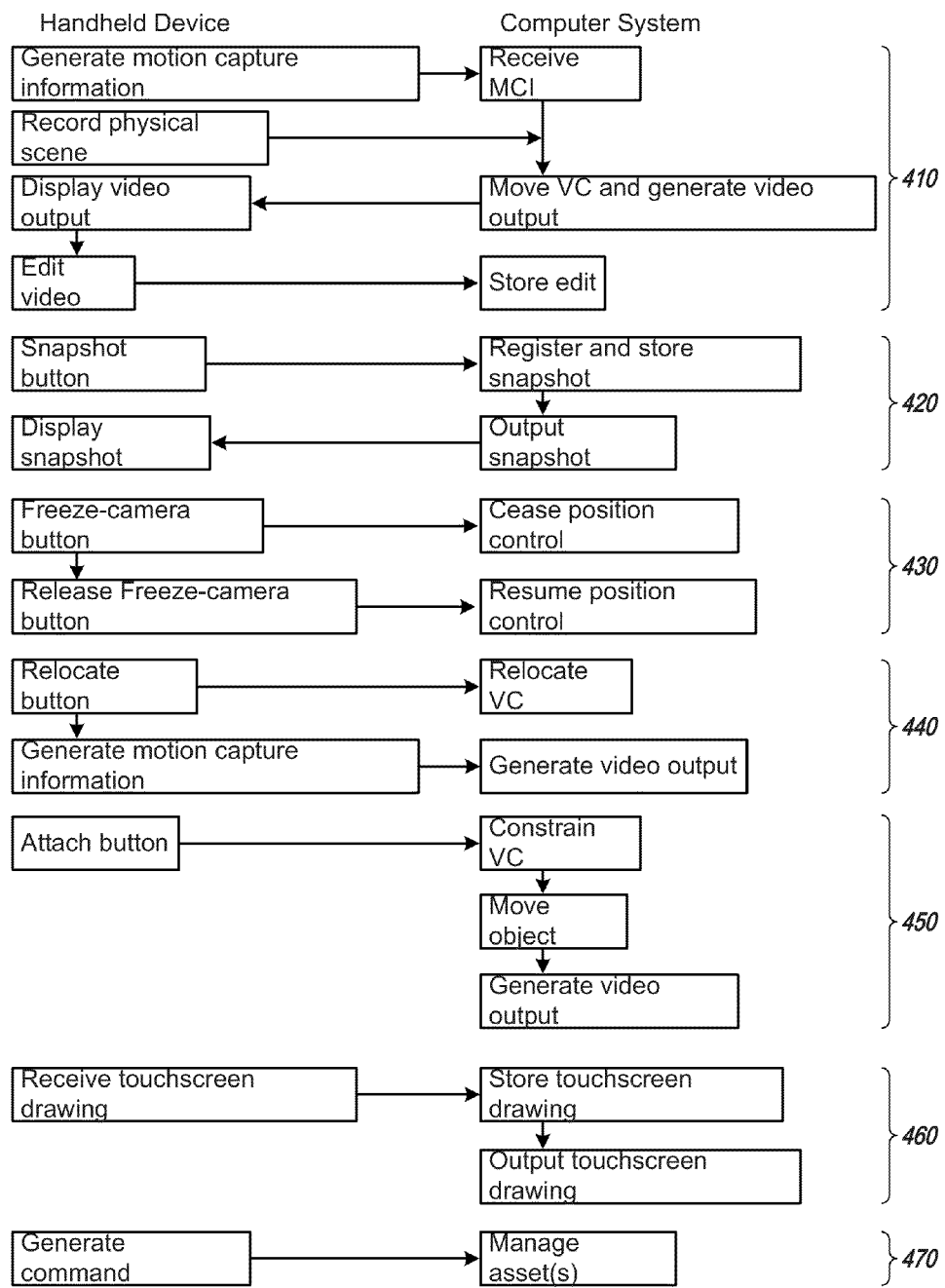
FIG. 4 shows operations that can be performed by a handheld device and a computer system, respectively.

FIG. 4 shows operations 400 that can be performed by a handheld device and a computer system, respectively. For example, the handheld devices of FIGS. 1 and 3, and the system of FIG. 1, can perform the operations 400. In the following examples, the handheld device continuously displays an output view generated by the computer system, unless otherwise noted.

Here, the operations 400 include operations 410 that can be characterized as the standard operation of the system. That is, the handheld device here first generates motion capture information, which is received by the computer system. In some implementations, the handheld device records one or more images of a physical scene; for example, the handheld device 102B (FIG. 1) can record the physical scene using the lens 128. The computer system in response moves a virtual camera (VC) and generates a corresponding video output of the virtual scene. Video output from the computer system can generally include virtual image information, or physical image information, or combinations thereof. The handheld device receives and displays the video output. In each of the operations 420-470, the handheld device can also record the physical scene and/or display video output received from the computer system.

The user can also edit the video on the handheld device, and such edit(s) can be stored in the computer system.

The operations 400 include operations 420 that can be characterized as a snapshot operation of the system. Here, the user presses a snapshot button on the handheld device, and the computer system in response stores the snapshot. Subsequently, the computer system outputs the snapshot, and the snapshot is displayed or otherwise presented by the handheld device.

The operations 400 include operations 430 that can be characterized as a "freeze" operation of the system. Assume, for example, that the user in FIG. 1 has moved the handheld device 102 up to the edge of the area 119, but that the user wishes to have the virtual camera move further than that, which would require the device to be moved outside the boundary of the area 119. In some implementations, crossing the boundary is not meaningful (e.g., because motion tracking would then be lost or unreliable) or even possible (e.g., the boundary is a solid wall that blocks the user).

While at the boundary, the user can execute a freeze command, for example by pressing a freeze button. The computer system, in response, ceases position control of the virtual camera(s). That is, even if the handheld device generates motion capture data at this time, the computer system does not move the virtual camera, because position control has temporarily been ceased. Accordingly, the virtual camera remains essentially in the position it had before the freeze command. Meanwhile, the user can move the handheld device, such as to the center of the area 119.

When the user releases the freeze button, the computer system in response resumes position control of the virtual camera. Because the virtual camera remained in position while the handheld device was relocated, the user now has room within the area 119 to move the handheld device in the intended direction without crossing the boundary. In some implementations, another event than releasing the pressed button triggers resumption of position control. For example, the freezing can be active for a predefined or user-specified time, after which it automatically resumes, or the user can again press the button, or a different button, to make the computer system resume position control.

The operations 400 include operations 440 that can be characterized as a "fly" operation of the system. For example, if motion tracking is used with a virtual scene that is widespread, such as an entire city, country or planet, it may be inefficient or infeasible for the user to physically move the device every time a relocation in the virtual scene is needed. The user can therefore generate a relocate command, for example by pressing a relocate button on the handheld device. In response, the computer system performs the specified relocation, such as by moving a virtual camera or other object from one place in the virtual scene to another. For example, the virtual camera can be translated forward or backward, to the left or right, and up or down. In a sense, the user may perceive this as if "flying" in the virtual scene because the movement does not require the handheld device to be relocated. When the handheld device generates motion capture information, it is applied to the virtual camera (or the other object) at its new location.

The operations 400 include operations 450 that can be characterized as an "attach" operation of the system. The attach operation is used to attach the virtual camera to an object (e.g., to an asset, a character or other item in the virtual scene). When the user generates an attach command, for example by pressing an attach button, the virtual camera is moved to the object and a temporary association is created so that the virtual camera undergoes the same or similar movement as the object. For example, the virtual camera can be logically constrained to the object. Other examples of constraints in a virtual space will be described below.

In some implementations, the operations 450 can cause the virtual camera to be constrained relative to the object. In some situations, while the camera is instructed to be fixed (i.e., stationary) it will actually remain fixed relative to the object (which may be moving). In other situations, when the virtual camera is instructed to move, this movement is performed relative to the object. For example, the motion vector of the object and a motion vector imposed on the camera can be combined by vector addition to obtain a resulting movement direction and speed for the camera.

In some implementations, a moviemaker or other user may wish to have the camera travel around the virtual scene to quickly get an overview of it. The user can then attach the virtual camera to a suitable object that is known or expected to travel through the area(s) of interest. For example, when one of the assets 112 or the character 114 (FIG. 1) is moving through the layout 108 (FIG. 1), a virtual camera attached to the object can show a quick overview on the display of the covered areas. The attachment of the virtual camera to the object can be removed if the camera is instead attached to another object, or if the camera is freed from the object, in which case the camera will remain at its current location (until it is moved).

The operations 400 include operations 460 that can be characterized as a "digital overlay" operation of the system. The user can draw on, or otherwise mark, a touchscreen of the handheld device, and in response the computer system stores the corresponding drawing, annotation, etc. Later, the computer system can output the digital overlay information, for example together with a view of the virtual scene in the state it had when the digital overlay was created.

The operations 400 include operations 470 that can be characterized as an "asset management" operation of the system. The user can generate a command, for example using a touchscreen, or by pressing a button, or by motion capture. Such a command can correspond to the user adding, moving, modifying or deleting an asset, or any other object, in the virtual scene. In response, the computer system manages the asset or other object accordingly.

Figure 5:
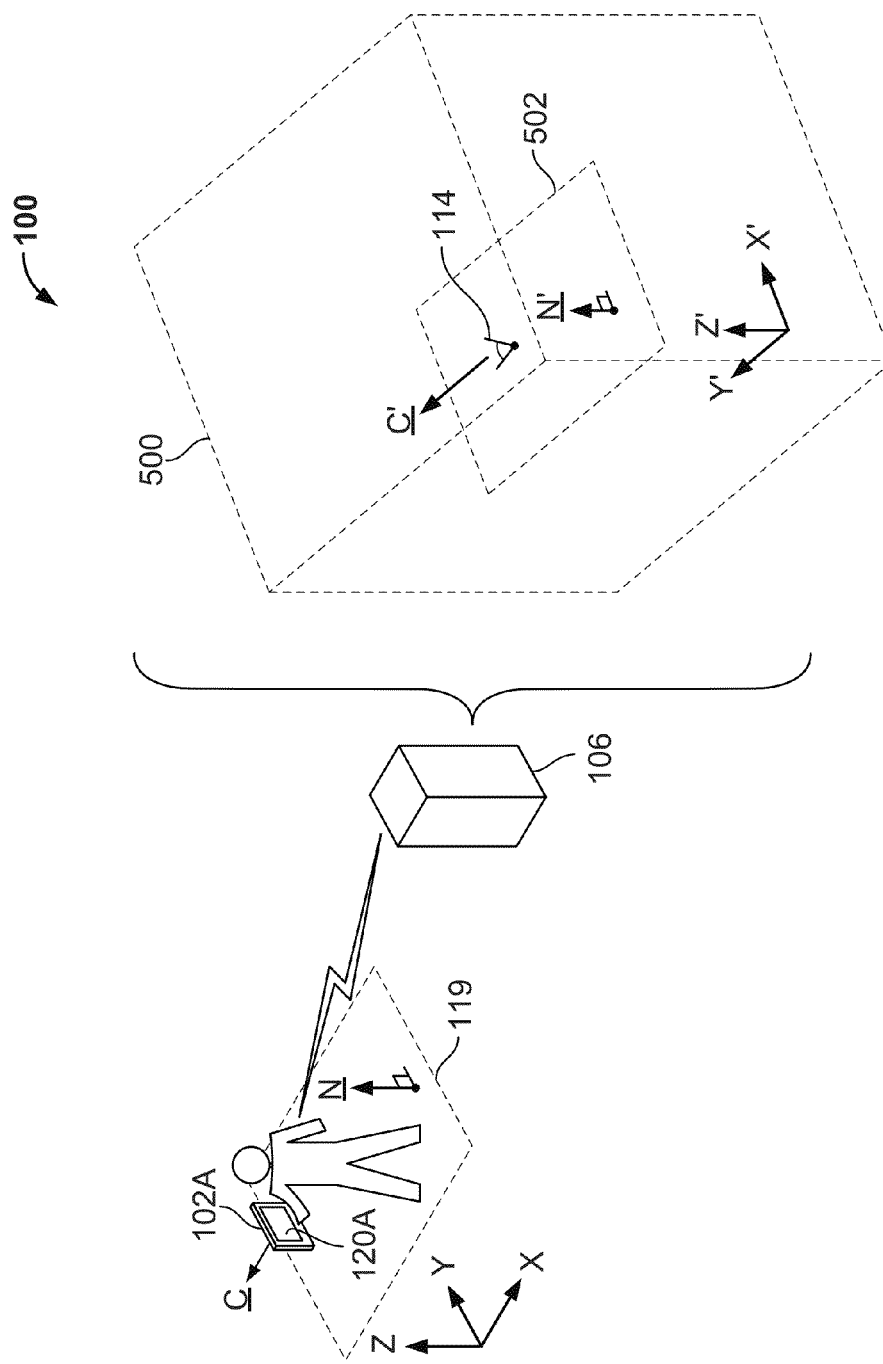
FIG. 5 schematically shows another example of the system of FIG. 1.

FIG. 5 schematically shows another example of the system 100 of FIG. 1. Here, a virtual space 500 has been defined. That is, a user holding the handheld device 102 (in this example, the handheld device 102A with the tablet form factor), can move and/or take one or more positions in the area 119 (e.g., within the "volume" on a motion-capture stage). The computer system 106 will capture this motion, control objects in the virtual space 500 accordingly, such as by moving the virtual camera 114, and generate one or more outputs for presentation on the display 120A, in this example.

More particularly, the motion capture system can define any type of coordinate system for the area 119. Here, a Cartesian coordinate system is used, having orthogonal axes labeled x, y and z, respectively. In some implementations, one or more other types of coordinate systems can be used, for example a polar or a cylindrical coordinate system.

Likewise, a coordinate system is defined for the virtual space 500. Here, a Cartesian coordinate system is used, having orthogonal axes labeled x', y' and z', respectively. In other implementations one or more other types of coordinate systems can be used for the virtual space 500, including a different coordinate system than what is used for the area 119. In such situations, a suitable translation of coordinate values can be performed by the computer system 106.

Accordingly, any position or direction in the area 119 (i.e., on the motion capture stage) can be defined in terms of (x, y, z) coordinates. In this implementation, a normal vector $\underline{N}$ is here illustrated for the area 119, and the handheld device 102A is shown to currently be aimed in an arbitrary direction labeled $\underline{C}$. For example, $\underline{C}$ corresponds to the direction that the camera of the handheld device 102A (when so equipped) is aimed. As another example, the user would typically be looking at the display 120A in a direction corresponding to $\underline{C}$.

The virtual space 500 has defined therein a representation 502 corresponding to some or all of the area 119. The representation 502 is here illustrated as being visible in the virtual space 500 for clarity, but may have no visible characteristic in an actual implementation. Rather, the representation 502 specifies the boundaries for movement in the virtual space 500 based on tracked motion in the area 119.

Each of the representation 502 and the area 119 can have any form independent of each other, and are here both shown as rectangles. In some implementations, the representation 502 is defined so that its sides are mapped to respective sides of the area 119, and so that every point (x, y, z) defined relative to the area 119 is mapped to one or more points (x', y', z') in the virtual space 500.

Here, a normal vector $\underline{N}'$ is defined for the representation 502, and the virtual camera 114 is shown to currently be aimed in a direction labeled $\underline{C}'$. For example, the representation 502 has been defined in its current position based on the specifications for the virtual space 500, and the camera 114 has been oriented based on the tracked motion of the handheld device 102A. In the following, some examples will be described where the representation 502 can be at least partly redefined to serve one or more purposes.

Figure 6A:
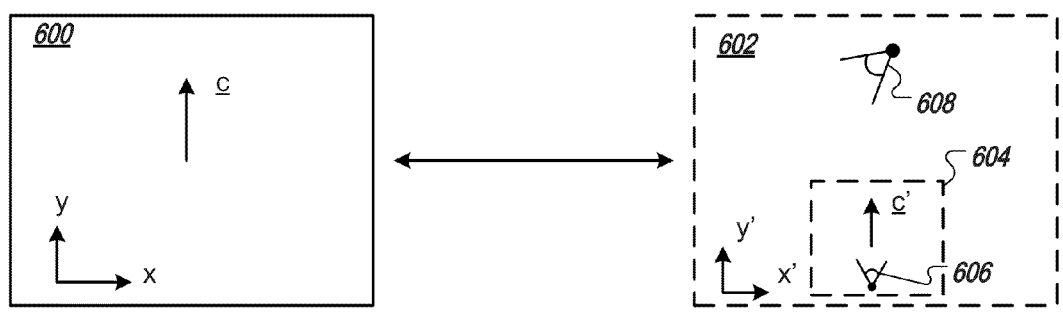
FIGS. 6A-B schematically show examples of alignment between a motion-capture stage and a virtual space.
Figure 6B:
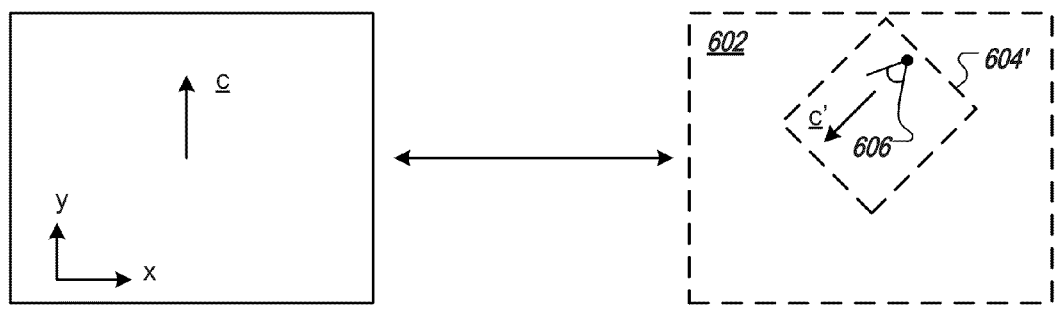

FIGS. 6A-B schematically show examples of alignment between a motion-capture stage 600 and a virtual space 602. For clarity, the motion-capture stage 600 and the virtual space 602 are here illustrated as two-dimensional, but it is understood that motion can be tracked in three dimensions, and/or that the virtual space 602 can be three-dimensional. Accordingly, direction and location are here specified using (x, y) coordinates on the motion-capture stage 600, and using (x', y') coordinates in the virtual space 602. Similar to the description of the representation 502 (FIG. 5), the virtual space 602 here has a representation 604 defined which represents the motion-capture stage 600.

The current position and orientation of the handheld device (not shown) on the motion-capture stage 600 is here schematically illustrated by a vector $\underline{C}$. As a result of motion capture, a virtual camera 606 that is defined in the virtual space 600 is currently positioned and orientated as illustrated by a vector C'.

Assume now that the user would like to reposition the virtual camera 606 to another area, and/or into another orientation, in the virtual space 600. For example, another virtual camera 608 has here been defined in another part of the virtual space 602, and the user may wish to place the current virtual camera in that location. One way of accomplishing this may be for the user to move the handheld device within the motion-capture stage 600 until the motion tracking has relocated the virtual camera 608 as desired. However, depending on the size of the virtual space 602 and the representation 604, it may be inconvenient or even physically impossible to move the handheld device sufficiently far within the motion-capture stage 600. That is, the virtual camera 608 in this example is located outside the representation 604, meaning that motion capture cannot currently move the virtual camera 606 to the location of the virtual camera 608.

Another way of accomplishing relocation and/or reorientation is therefore to selectively attach, or in any other way associate, the virtual camera 606 with one or more objects defined in the virtual space 602. This is sometimes referred to as "snapping" the current virtual camera to the object(s). The virtual camera 606 can be snapped to any type of object(s) in the virtual space, including, without limitation, a character, an asset, or another virtual camera. Here, the user inputs a command, such as using the handheld device, to snap the virtual camera 606 to the virtual camera 608.

FIG. 6B shows a result of such snapping. Here, the virtual space now instead includes another representation 604', in which the virtual camera is placed at the position of the virtual camera 608 (FIG. 6A). Depending on the implementation, the coincidence of two or more virtual cameras can cause one or more of the cameras to be deactivated, deleted, repositioned, or reoriented, to name just a few examples. The virtual camera 606 is currently aimed in a direction $\underline{C}$', for example based on the orientation of the virtual camera to which it was snapped. Thus, the user-who may have remained stationary during the snapping—can now see the new view captured by the virtual camera 606 (i.e., the view of the virtual space in the direction $\underline{C}$') instead of the view that was shown when the virtual camera had its previous position.

One or more constraints can be applied to the snapping. The constraint(s) can affect or otherwise involve any aspect or characteristic of the representation 604'. In some implementations, the things that the constraint(s) can affect or involve include, but are not limited to, the representation's height, location, rotation, orientation, direction of movement and/or speed. For example, constraints for snapping can be defined that correspond to user instructions such as:

"keep only my camera's current elevation and orientation"
"keep only my camera's current tilt and pan" or
"keep the representation 'horizontal' in the virtual space."

In the last example, horizontality can be defined in relation to a base plane of the virtual space and/or in relation to a force defined in the virtual space.

Figure 7A:
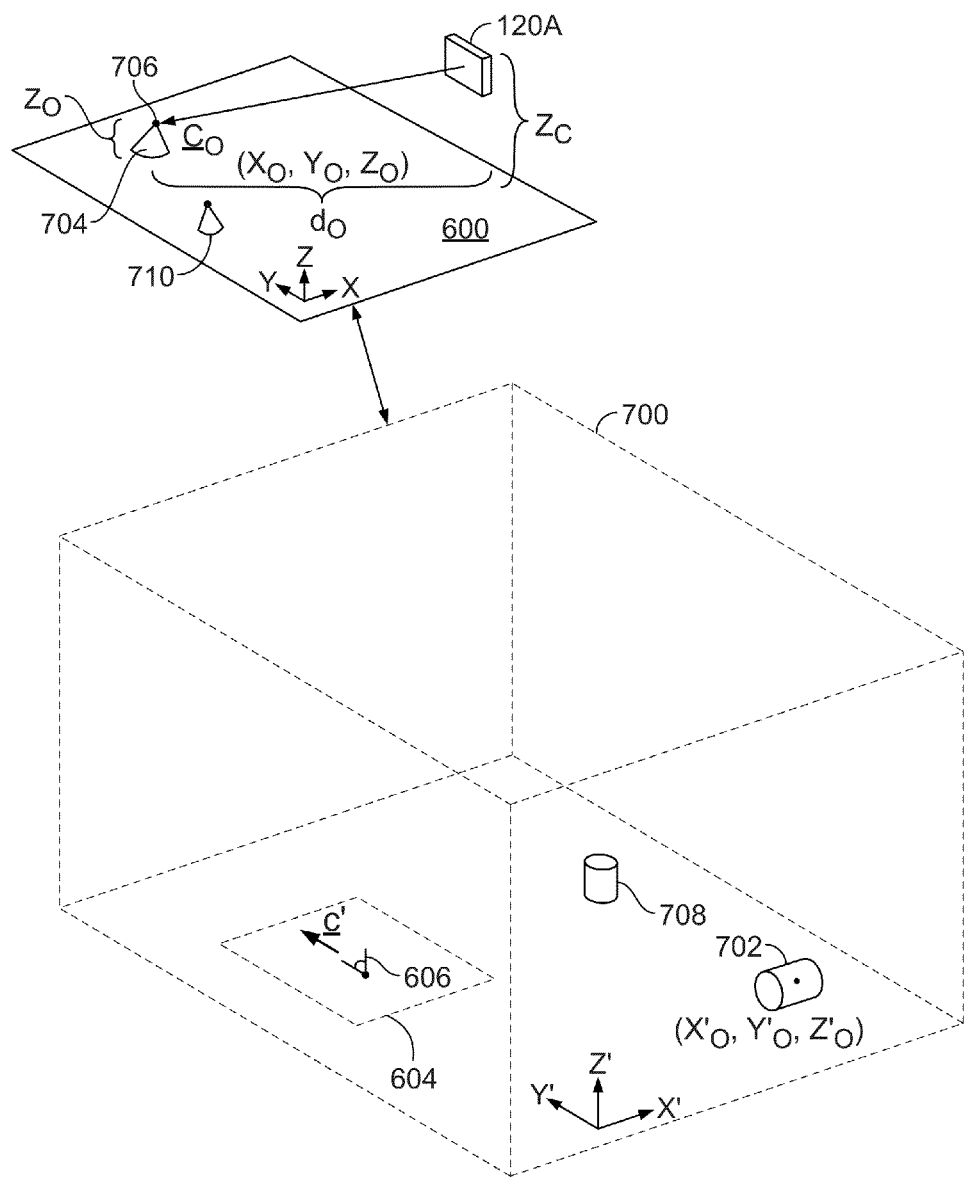
FIGS. 7A-C schematically show examples of alignment between the motion-capture stage of FIGS. 6A-B and another virtual space.
Figure 7B:
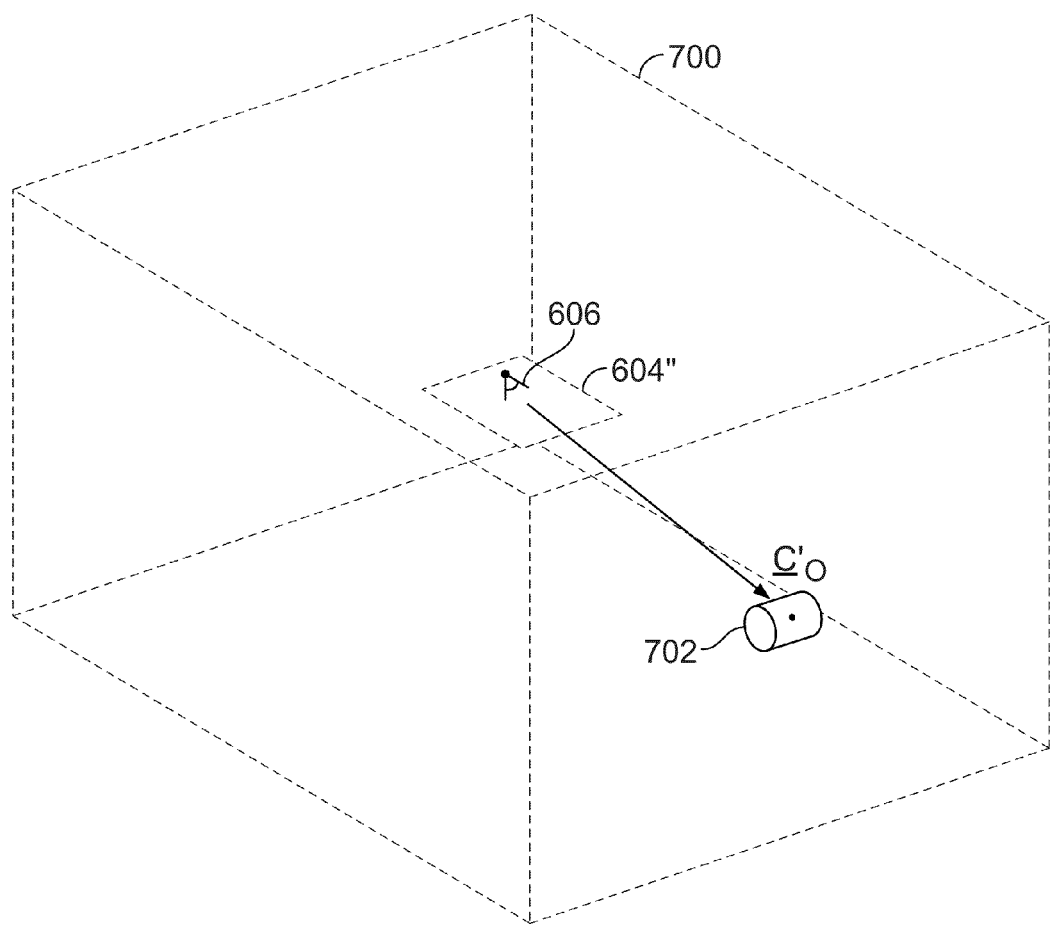
Figure 7C:
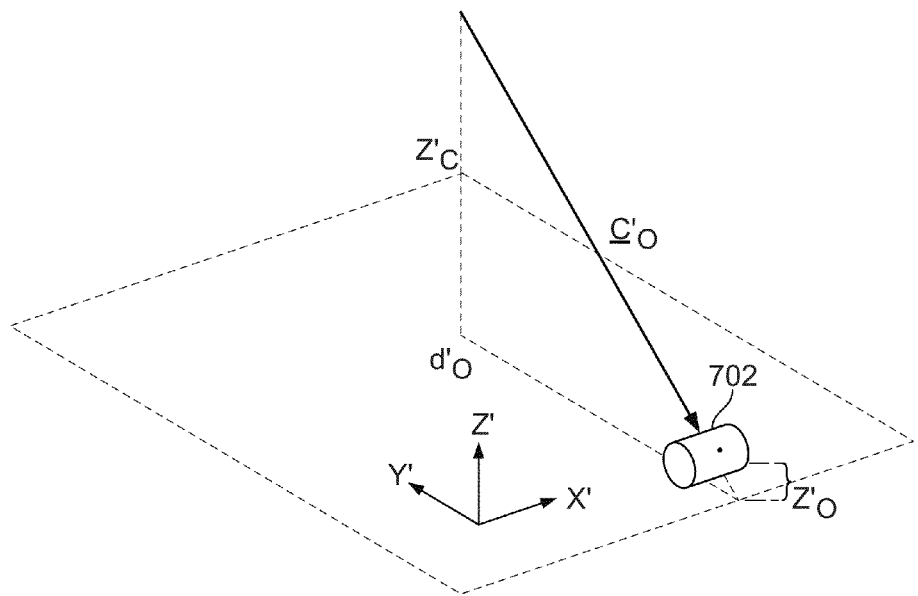

A procedure that can be characterized as "alignment" can be performed relative to one or more motion captured physical objects. FIGS. 7A-C schematically show examples of alignment between the motion-capture stage 600 of FIGS. 6A-B and another virtual space 700. The virtual space 700 is here illustrated in three dimensions, and can be similar or equivalent to the virtual space 500 (FIG. 5) described above.

An example of a situation where alignment relative to a physical object can be done is where the cameraperson (i.e., the user with the handheld device) wants to make better use of the space that is available in the motion-capture stage 600. Assume, for example, that the cameraperson is planning to record video of an object 702 in the virtual space 700. The object 702 can be any type of object, such as a character or a set piece. The virtual camera 606, however, is currently oriented in the $\underline{C}$' direction, which does not face the object 702. Moreover, the object 702 is currently outside the representation 604. The cameraperson therefore wants to redefine the representation 604 in a way that makes it easier to shoot video of the object 702.

First, a physical object 704 is provided in the motion-capture stage 600. The physical object 704 can be any type of object including, but not limited to, a C-stand, a tripod or other stand, a solid block, a vehicle, furniture, a set prop, a tool, clothing, and combinations thereof. In some implementations, a human being can serve as the physical object 704. Here, the physical object 704 is schematically illustrated as a cone.

The physical object 704 is motion captured on the stage 600. In some implementations, a motion capture marker 706 is provided on the physical object. For example, the motion capture marker can be, or include, a reflective sphere. Likewise, the handheld device 102 (in this example, the device 102A) is also motion captured, by the same or a different motion capture technology as the physical object 704. Accordingly, the motion capture system knows the respective locations of the handheld device and the physical object.

The physical object 704 is placed at a location on or by the motion-capture stage 600 based on where the cameraperson wants to aim the handheld device 102A. Particularly, the placement is done so that the cameraperson will aim the handheld device at the location of the motion capture marker 704. Here, the location of the motion capture marker 704 is labeled ($x_O$, $y_O$, $z_O$). This location can be anywhere within the motion-capture stage.

The cameraperson then assumes a position for the video shoot. After the cameraperson positions the handheld device 120A relative to the physical object 704, the motion capture system can define a vector $\underline{C}_O$ between them. The vector $\underline{C}_O$ depends on characteristics of the respective locations of the handheld device and the motion capture marker. For example, the motion capture marker may have an elevation $z_O$ over the motion-capture stage 600 and the handheld device may have an elevation $z_C$. The horizontal distance between them is here labeled $d_O$. These characteristics will be used to redefine the representation 604 in the virtual space 700 relative to a current location of the object 702, which is here labeled ($x_O$', $y_O$', $z_O$').

FIG. 7B shows the virtual space 700 where a representation 604" has been defined instead of the earlier representation. Particularly, the representation 604" is defined so that a vector $\underline{C}_O$' can be defined between the virtual camera 606 and the object 702. If the virtual camera 606 is now in the desired position, the cameraperson can begin the video shoot. Otherwise, the virtual camera can be adjusted in some way, for example by translation, rotation, tilting, panning, rolling and/or zooming. This illustration shows the object 702 as being outside the representation 604", but depending on scaling, etc., the alignment can alternatively be performed so that the representation 604" as defined also includes the location ($x_O'$, $y_O'$, $z_O'$).

The vectors $\underline{C}_O$ and $\underline{C}_O'$ bear some relationship to each other. In some situations, they are virtually identical. For example, when the object 702 is a character of approximately human size and the cameraperson wants to make a steadycam shot of the character, the mapping between the motion capture stage 600 and the virtual space 700 can be done on a 1:1 basis. That is, the representation 604" is then defined so that the spatial relationship between the virtual camera 606 and the object 702 is essentially like that between the handheld device and the physical object on the motion-capture stage.

With reference now also to FIG. 7C, it shows the vector characterized by an elevation $z_C'$ and by a horizontal distance $d_O'$ to the object 702, which object in turn has an elevation $z_r'$. Accordingly, the 1:1 mapping is characterized by the following:

$z_O' = z_O$
$z_C' = z_C$
$d_O' = d_O$

In other situations, one or more aspects can differ between the vectors $\underline{C}_O$ and $\underline{C}_O'$. For instance, when the virtual camera 606 is supposed to capture the view from a helicopter of the ground below, then at least the elevation $z_C'$ will be greater than the elevation $z_C$. In such an example, a separation of ten feet between the handheld device 102A and the physical object 704 can be scaled to 100 feet (or more) in the virtual space. The scaling can be performed equally in all dimensions, or in some implementations the user can specify different (or no) scaling for one or more characteristics.

With reference again to FIG. 7A, the cameraperson can align two or more physical objects with objects in the virtual space 700. Assume, for example, that the cameraperson wants the snapping performed with regard to the object 702 and also another object 708 that is defined in the virtual space. The cameraperson can then make use of another physical object 710 that is also motion-captured in the stage 600. For example, the physical object 710 can be similar to the physical object 704. The cameraperson can then specify one or more parameters for the alignment, for example as will now be described.

Figure 8:
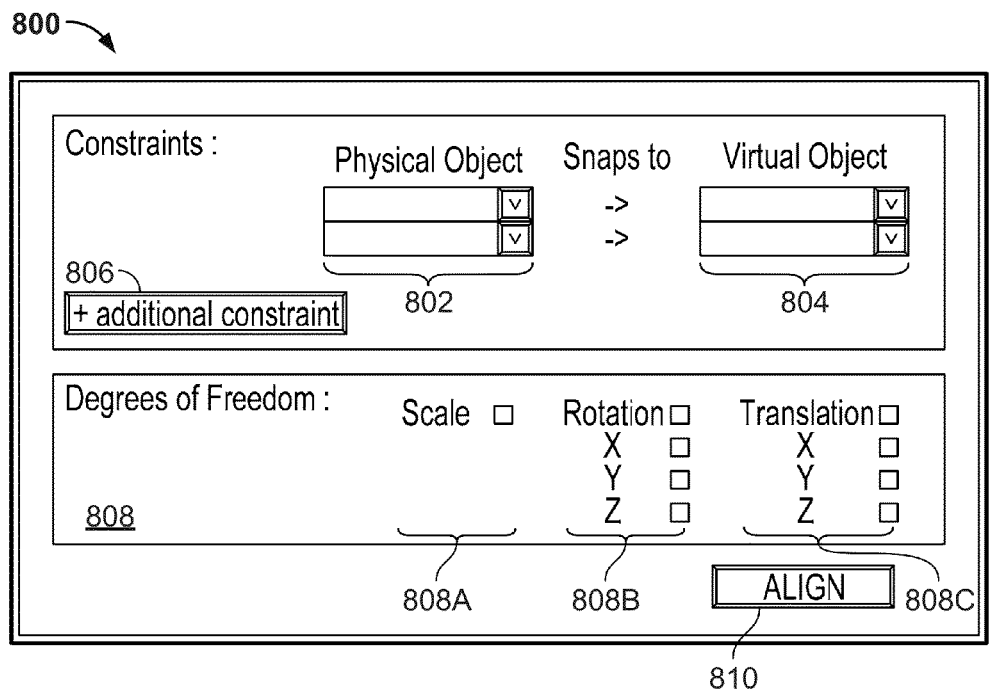
FIG. 8 shows an example of a graphical user interface that can be used for alignment between a motion-capture stage and a virtual space.

FIG. 8 shows an example of a graphical user interface (GUI) 800 that can be used for alignment between a motion-capture stage and a virtual space. For example, the GUI 800 can be generated on the handheld device 102A or B (FIG. 1). Generally, the GUI 800 provides that the user (e.g., the cameraperson) can specify one or more pairs of a physical object and a virtual object. The GUI 800 here includes an input control 802 for specifying one or more physical objects. For example, the physical object 704 (FIG. 7A) and/or the physical object 710 may have been detected by the motion capture system, and based on this each of the one or more objects becomes a valid input in the control 802. In some implementations, the input control 802 includes list boxes showing identifiers for one or more physical objects that are being tracked on the motion capture stage. That is, each list box can contain the entire set of physical objects that the user can choose between. When the user selects a particular physical object using one of the list boxes, the corresponding identifier can automatically be omitted from the other list boxes.

The GUI 800 here includes an input control 804 for specifying one or more objects in the virtual space. For example, the object 702 (FIG. 7A) and/or the object 708 can be specified using the control 804. The input control 804 can include multiple list boxes that each identifies the set of available object(s) in the virtual space, in analogy with the example above for the input control 802.

For example, in the implementation described with reference to FIGS. 7A-C the user can define the following pairs for the snapping:

physical object 704 → virtual object 702
physical object 710 → virtual object 708

In implementations where the user can align the handheld device with an object in the virtual space (cf. the description of FIGS. 6A-B above), one of the available entries for the input control 802 can be "handheld device". The user's input in the input control 804 then specifies the virtual object with which the handheld device should be aligned (e.g., the virtual camera 608 in FIG. 6A).

In some implementations, the GUI 800 can provide for searching and/or filtering in either or both of the input controls 802 and 804. For example, the user may specify that only a particular type of virtual object (e.g., only characters) should be available, or that only objects within a particular region are relevant. Such region(s) can be defined for the motion-capture stage or for the virtual space, or for both.

The GUI 800 includes a control 806 for specifying at least one additional restriction or constraint on the alignment. For example, one or more of position, elevation, distance, angle, roll, pan and tilt can be constrained. Here, the control 806 causes an input control 808 to be displayed. The input control 808 is used for specifying one or more parameters for the alignment. Here, the input control 808 relates to the degrees of freedom of the handheld device. For example, a control 808A provides that the user can control the scaling between the motion-capture stage and the virtual space with regard to one or more dimensions. The default setting may be a scaling of 1:1, and otherwise the user can specify an amount of scaling (e.g., 1:2 or 2:1).

For example, a control 808B provides that the user can restrict the alignment by preserving one or more degrees of freedom for the handheld device. Here, rotation can be preserved in one or more dimensions (i.e., in the x-, y- or z-dimension). That is, the virtual camera will remain aligned with the designated virtual object, except that the cameraperson can use the handheld device to rotate the virtual camera in one or more dimensions, according to the setting.

Similarly, a control 808C provides that the user can restrict the alignment by preserving the freedom for the handheld device to translate the virtual camera in one or more dimensions (i.e., in the x-, y- or z-dimension).

When the user is done entering information, an Align control 810 will trigger the alignment. That is, the system receiving the user's input will look at the relative transformation positions of the handheld device and one or more objects, and perform rotation, translation and/or scaling so that the alignment becomes as specified.

In implementations where more than one physical object is used, depending on the settings of the snapping and/or on the position of the handheld device, it may not be possible to obtain a perfect alignment in the virtual space. In such situations, a best-fit algorithm can be performed. For example, the algorithm can seek the position for the virtual camera that differs the least from the physical relationship between the handheld device and the physical objects. One or more constraints can be taken into account.

Figure 9:
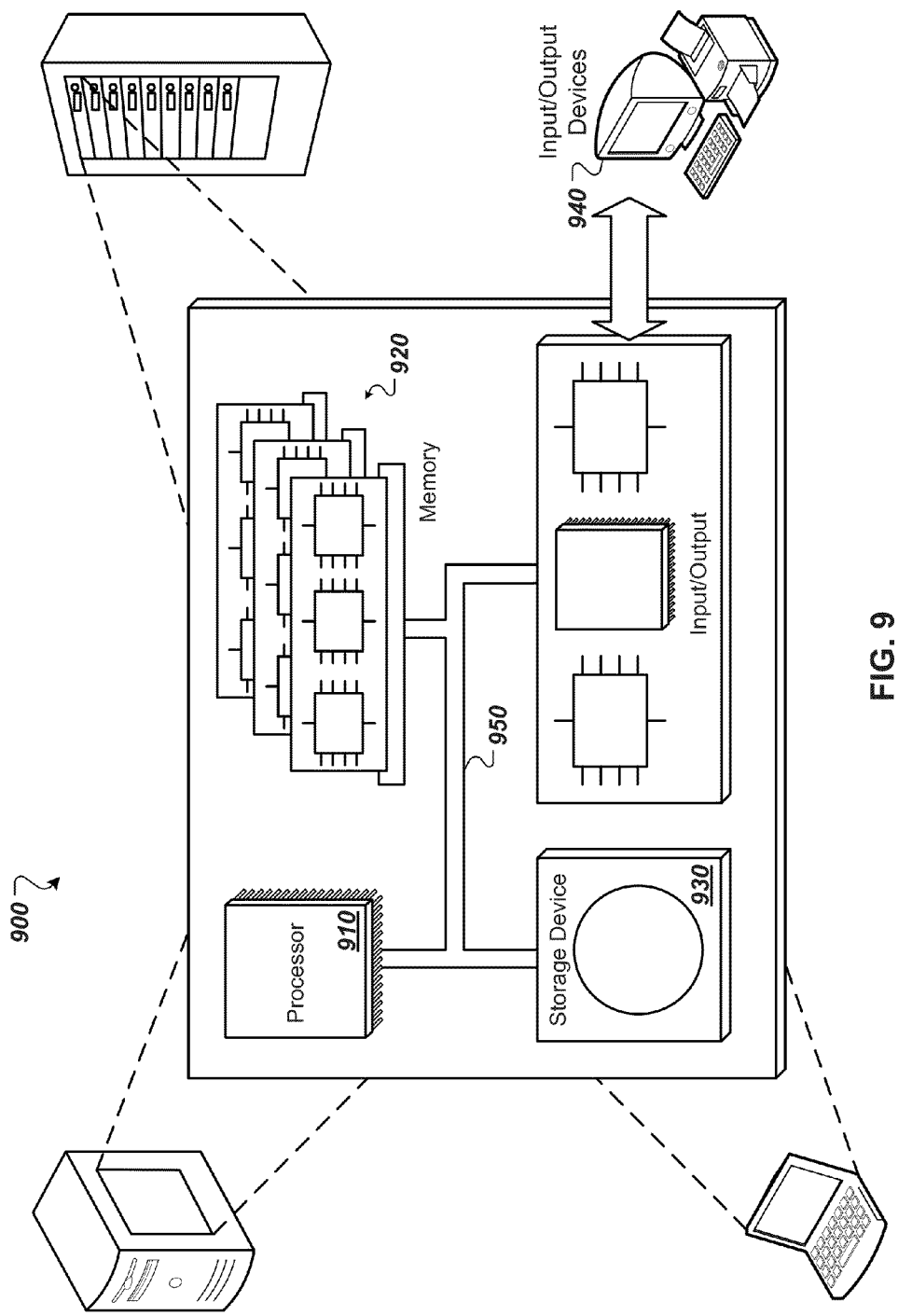
FIG. 9 is a block diagram of a computing system that can be used in connection with computer-implemented methods described in this document.

FIG. 9 is a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit in some implementations and is a non-volatile memory unit in other implementations.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising operating a computer system comprising one or more processors in one of a set of modes, wherein:
   operating the computer system in a first mode comprises:
      generating motion capture information of a handheld device in an environment;
      accessing a representation of a virtual scene comprising a virtual camera associated with the virtual scene;
      rendering the virtual scene from a first perspective based at least in part on the generated motion capture information and the virtual camera associated with the virtual scene, wherein the virtual camera comprises data including a point in space and a direction of a field of view;
      receiving a first input from a user specifying a modification of at least one of the point in space of the virtual camera or the field of view of the virtual camera; and
      rendering in response to the first input, the virtual scene from a second perspective based on the virtual camera associated with the virtual scene, wherein the second perspective is different from the first perspective; and
   operating the computer system in a second mode comprises:
      modifying virtual assets defined for the virtual scene in response to a second input, received at a handheld device, wherein the modifying includes adding, relocating, removing or altering an appearance of at least one of the virtual assets defined for the virtual scene; and rendering the virtual scene from a third perspective.

2. The computer-implemented method of claim 1, wherein the handheld device is capable of recording images and comprises a visual display.

3. The computer-implemented method of claim 2, wherein the rendering of the virtual scene from the second perspective is displayed on the visual display of the handheld device.

4. The computer-implemented method of claim 2, wherein the motion capture information of the handheld device is received by the computer system from a motion capture system, separate from the handheld device, that tracks the motion of the handheld device, and the tracked motion is used to determine the first perspective of the virtual scene.

5. The computer-implemented method of claim 4, wherein the handheld device comprises motion capture marks capable of detection by the separate motion capture system.

6. The computer-implemented method of claim 1, wherein the point in space of the virtual camera in the virtual scene specified by the first input comprises a location on one of the virtual assets.

7. The computer-implemented method of claim 6, wherein the first input further comprises a constraint on the field of view within the virtual scene of the virtual camera.

8. A computer-implemented method comprising operating a computer system comprising one or more processors in one of a set of modes, wherein:
   operating the computer system in a first mode comprises:
      accessing a representation of a virtual scene comprising a virtual camera associated with the virtual scene;
      rendering the virtual scene from a first perspective based at least in part on a virtual camera associated with the virtual scene, wherein the virtual camera comprises data including a point in space and a direction for a field of view;
      receiving motion information from a handheld device in an environment;
      determining at least one of an updated point in space of the virtual camera in the virtual scene or an updated direction for a field of view within the virtual scene of the virtual camera based on the motion information from the handheld device and an association between the virtual camera and a position of the handheld device;
      rendering the virtual scene from a second perspective based at least in part on the updated point in space of the virtual camera or the updated direction for a field of view of the virtual camera; and
   operating the computing device in a second mode comprises:
      rendering the virtual scene from the second perspective for display on the handheld device; and
      modifying virtual assets defined for the virtual scene in response to input received at the handheld device, wherein the modifying includes adding, relocating, removing or altering an appearance of at least one of the virtual assets defined for the virtual scene.

9. The computer-implemented method of claim 8, wherein the handheld device comprises a visual display, is capable of recording images, and the motion information from the handheld device comprises recorded image data.

10. The computer-implemented method of claim 9, wherein the handheld device is operated in a motion capture stage, the virtual scene includes a representation of the motion capture stage, and the motion information received from the handheld device comprises images of the motion capture stage.

11. The computer-implemented method of claim 8, wherein motion of the handheld device is tracked by a motion capture system, and the tracked motion is used to determine the first perspective of the virtual scene.

12. The computer-implemented method of claim 11, wherein the motion capture system is separate from the handheld device, and the handheld device comprises motion capture marks capable of detection by the separate motion capture system.

13. The computer-implemented method of claim 8, wherein the point in space of the virtual camera in the virtual scene specified by the first input comprises a location on one of the virtual assets.

14. A system comprising:
   a computing device comprising:
      a processor; and
      a memory communicatively linked to the processor, wherein the memory is configured to store a representation of a virtual scene; and
   a handheld device communicatively linked to the computing device;
   wherein the memory comprises instructions that cause the computing device to operate in one of a set of modes, wherein:
      operating the computing device in a first mode comprises:
         storing the representation of the virtual scene in the memory;
         rendering the virtual scene from a first perspective based at least in part on a virtual camera associated with the virtual scene, wherein the virtual camera comprises data including a point in space and a direction for a field of view;
         receiving motion information from the handheld device in an environment;
         determining at least one of an updated point in space of the virtual camera in the virtual scene or an updated direction a field of view within the virtual scene of the virtual camera based on the motion information from the handheld device and an association between the virtual camera and a position of the handheld device;
         rendering the virtual scene from a second perspective based at least in part on the updated point in space of the virtual camera or the updated direction for a field of view of the virtual camera; and
      operating the computing device in a second mode comprises:
         rendering the virtual scene from the second perspective for display on the handheld device; and
         modifying virtual assets defined for the virtual scene in response to input received at the handheld device, wherein the modifying includes adding, relocating, removing or altering an appearance of at least one of the virtual assets defined for the virtual scene.

15. The system of claim 14, wherein the handheld device comprises a visual display, is capable of recording images, and the motion information from the handheld device comprises recorded image data.

16. The system of claim 14, wherein the handheld device is operated in a motion capture stage, the virtual scene includes a representation of the motion capture stage, and the motion information received from the handheld device comprises images of the motion capture stage.

17. The system of claim 14, further comprising a motion capture subsystem capable of tracking the handheld device, wherein tracked motion of the handheld device is used to determine the first perspective of the virtual scene.

18. The system of claim 17, wherein the motion capture system is separate from the handheld device, and the handheld device comprises motion capture marks capable of detection by the separate motion capture system.

19. A computer program product tangibly embodied in a non-transitory computer-readable medium and comprising instructions that when executed by a computer system cause the computer system to operate in one of a set of modes, wherein:
   operating the computer system in a first mode comprises:
      accessing a representation of a virtual scene comprising a virtual camera associated with the virtual scene;
      rendering the virtual scene from a first perspective based at least in part on a virtual camera associated with the virtual scene, wherein the virtual camera comprises data including a point in space and a direction for a field of view;
      receiving motion information from a handheld device in an environment;
      determining at least one of an updated point in space of the virtual camera in the virtual scene or an updated direction-a field of view within the virtual scene of the virtual camera based on the motion information from the handheld device and an association between the virtual camera and a position of the handheld device;
      rendering the virtual scene from a second perspective based at least in part on the updated point in space of the virtual camera or the updated direction for a field of view of the virtual camera; and
   operating the computer system in a second mode comprises:
      rendering the virtual scene from the second perspective for display on the handheld device; and
      modifying virtual assets defined for the virtual scene in response to input received at the handheld device, wherein the modifying includes adding, relocating, removing or altering an appearance of at least one of the virtual assets defined for the virtual scene.

20. The computer-program product of claim 19, wherein the handheld device comprises a visual display and is capable of recording images and wherein the motion information from the handheld device comprises recorded image data.

* * * * *